US006604161B1

(12) United States Patent
Miller

(10) Patent No.: US 6,604,161 B1
(45) Date of Patent: Aug. 5, 2003

(54) TRANSLATION OF PCI LEVEL INTERRUPTS INTO PACKET BASED MESSAGES FOR EDGE EVENT DRIVE MICROPROCESSORS

(75) Inventor: Steven Miller, Livermore, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/408,084

(22) Filed: Sep. 29, 1999

(51) Int. Cl.[7] .............................................. G06F 13/24
(52) U.S. Cl. ....................... 710/260; 710/262; 710/263
(58) Field of Search ................................. 710/260–266

(56) References Cited

U.S. PATENT DOCUMENTS

| | | | | |
|---|---|---|---|---|
| 5,727,219 A | * | 3/1998 | Lyon et al. .................. | 710/268 |
| 5,915,104 A | | 6/1999 | Miller ......................... | 395/309 |
| 5,953,511 A | | 9/1999 | Sescila, III et al. .......... | 395/309 |
| 5,956,516 A | * | 9/1999 | Pawlowski ................... | 710/260 |
| 6,003,109 A | * | 12/1999 | Caldwell et al. ............ | 710/262 |

OTHER PUBLICATIONS

"Address Munging Support in a Memory Controller/PCI Host Bridge for the PowerPC 603 CPU Operating in 32–Bit Data Mode", *IBM Technical Disclosure Bulletin*, 38, (Sep., 1995),237–240.

* cited by examiner

*Primary Examiner*—Rupal Dharia
(74) *Attorney, Agent, or Firm*—Schwegman, Lundberg, Woessner & Kluth, P.A.

(57) ABSTRACT

Translation of PCI level interrupts into packet based messages for edge event drive microprocessors includes, a bridge device receiving interrupts via an interrupt line from one or more PCI devices. The bridge device further sends an interrupt write packet to a CPU to launch the interrupt routine. The interrupt routine services the interrupt and the PCI device negates the interrupt line. At this point, the CPU generates a non-blocking write. This write causes the bridge to check the level of the PCI interrupt line. If the line is active with the interrupt, another write packet is sent, otherwise the interrupt line is negated and the blocking write is ignored. As a result, the present invention prevents an interrupt from a PCI device from being overlooked, from being missed, or from repeating the interrupt by a microprocessor. Also the present subject matter includes an error detection and containment system, which upon receiving a write packet from a PCI device via a PCI bus, the bridge device checks, encodes with source information, and flags the write requests having errors. Then a memory controller coupled to the bridge device receives the write requests and suppresses all write requests and disables all future write requests and interrupts coming from that PCI device having error. As a result, the present invention further prevents the write requests and interrupts from an invalid PCI device from corrupting the memory, to prevent the computer entering an unrecoverable state.

11 Claims, 6 Drawing Sheets

TRANSLATION OF PCI LEVEL INTERRUPTS INTO PACKET BASED MESSAGES FOR EDGE EVENT DRIVE MICROPROCESSORS

FIELD OF THE INVENTION

The present invention is related to input/output(I/O) architecture of a computer system, and more particularly to an interrupt handling subsystem of the I/O architecture.

BACKGROUND INFORMATION

Today's computer systems are very advanced, versatile, and sophisticated. Especially these computers are now commonly called upon to accept and process data from a wide variety of Peripheral Component Interconnect (PCI) devices such as network devices, modems, tape drives, disk drives, network controllers, Ethernet, ATM, graphic devices, pointers, keyboards, serial ports and printers via a PCI bus. Generally a bridge device is interposed between different bus schemes and acts as an interface between the bus and main memory/microprocessor (CPU). All write and interrupt operations involving PCI devices are routed to/from a PCI device via the PCI bus and an interrupt line respectively, through the bridge, to a memory controller and to/from the main memory. For example, during an interrupt transfer from the PCI device, the interrupt is translated into one or more write packets and sent to the microprocessor through the bridge and the memory controller. Further, during a data transfer to memory from the PCI device (memory writes), the PCI write operation is translated into one or more packets and sent to the main memory and/or microprocessor through the bridge and the memory controller. Generally all of the interrupts are level-based and level sensitive. Where as most of the new microprocessors want edge-based interrupts, which basically means that when an interrupt is asserted, the processor will then go into its interrupt service routine and service the input, and on the way out it exits the interrupt and clears the interrupt it exits, if the interrupt is still active it immediately jumps back in. Level-based means as long as the interrupt is at that level, the CPU has to go back in to execute the interrupt routine. Where as in the case of edge-based interrupts, all we need is an edge, you need an active occurrence. If the interrupt is not in transition, then the microprocessor does not have to go back to back to execute the interrupt routine. In general the input/output subsystem is connected via a packet or switch based network so that the packet is essentially an edge. An edge is an event that happens. Many of the new microprocessors are actually based on this edge-based interrupts. When there is multiple interrupts within the interrupt line, there is a chance that the microprocessor may not see the transition between the interrupts if the interrupts are level based. In situations like these the standard software solution to this problem would be to pole some register inside the bridge to wait for interrupt line to go high, so that the microprocessor can detect the next interrupt. Polling a bridge register while in the interrupt routine can take a microsecond or two and that's thousands of processor instruction cycles that the microprocessor is waiting. During this time the microprocessor cannot do anything, because the processor is waiting for the interrupt routine to complete and during this time the processor is not allowing other interrupts to be processed. This is wasting a lot of processor time.

Interrupts are transferred over the same path as memory write operations from PCI devices. If writes contain errors, these errors can corrupt memory or generate false interrupts. Corrupted memory and false interrupt can cause the computer to enter an unrecoverable state.

Thus, there is a need for an improved interrupt detection and translation system and method from the PCI devices on a PCI bus to prevent the computer system from missing an interrupt.

In addition, there is also a need for an improved error detection and containment system from PCI devices on a PCI bus to prevent the computer system from corrupting memory when errors occurs, and allowing the system to recover from the errors. Also there is a need to prevent the computer systems from generating false interrupts due to write errors. Further, there is also a need to increase the uptime of the computer system.

SUMMARY OF THE INVENTION

The above-mentioned shortcomings, disadvantages and problems are addressed by the present invention, which will be understood by reading and studying the following specification. The present system provides, among other things, an improved interrupt handling and translation and an improved error detection and containment from PCI devices.

According to one aspect of the present invention, interrupts are received by a bridge device via an interrupt line from one or more PCI devices. Then the bridge device encodes the interrupt with source and destination information, and sends an interrupt write packet to a microprocessor (CPU) through the memory controller to launch an interrupt routine. The interrupt routine services the interrupt and the PCI device negates the interrupt line. At this point, the CPU generates a non-blocking write rather than a blocking read to the bridge device. This write causes the bridge device to check the level of the PCI interrupt line. If the line is asserted (i.e., if the interrupt is still active in the interrupt line), then another write packet is sent by the bridge device, otherwise the interrupt line is negated, and the blocking write is ignored. As a result, the present invention prevents an interrupt from a PCI device from being overlooked, from being missed, or from repeating the interrupt by the PCI device. Furthermore, non-blocking write is used to write the interrupts to the registers contained in the bridge, the processor does not waste any cycles waiting for an interrupt from the bridge.

According to another aspect of the present invention, write transactions are received by a bridge via a Peripheral Component Interconnect (PCI) bus from PCI devices. Then the bridge checks the write transactions for parity errors. Further the bridge encodes the write transactions and the interrupts with the source and destination information and translates them into one or more packets of write requests. Then the bridge device flags the packet of write requests having errors. Then a memory controller coupled to the bridge device checks the write request packets for the error flag. If the flag is not set, then the memory controller transfers the write requests, and if the flag is set, then the memory controller suppresses the write requests, and disables all future write requests and interrupts from the PCI device associated with the write request containing the error. As a result, the present invention prevents the write requests and interrupts from an invalid PCI device from writing to the memory to prevent corrupting the memory in the computer system and stopping the entire input/output subsystem. Further, this also prevents losing of all data in the memory and increases the "up-time" of the computer system. Other aspects of the invention will be apparent on reading the following detailed description of the invention and viewing the drawings that form a part thereof.

DETAILED DESCRIPTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the figures generally corresponds to the figure number in which that component is first introduced, such that the same reference number is used throughout to refer to an identical component which appears in multiple figures. Signals and connections may be referred to by the same reference number or label, and the actual meaning will be clear from its use in the context of the description.

In this document interrupt line is asserted is understood to refer to that there are multiple interrupts overlapping in the interrupt line and the processor will not be able to detect the transition between interrupt signals. Further, in this document parity error is understood to refer to a technique of checking whether data has been lost or written over when it's moved from one place in storage to another.

GENERAL SYSTEM OVERVIEW

This document describes, among other things, a system and method of translation of PCI level interrupts into packet based messages for microprocessors based on edge event. This is accomplished by a bridge device by encoding the interrupt with source and destination information, and issuing an interrupt write packet to a microprocessor (CPU) through a memory controller to launch an interrupt routine. The interrupt routine services the interrupt and the PCI device negates the interrupt line. At this point the CPU generates a non-blocking write to the bridge device. This write causes the bridge to check the level of the PCI interrupt line. If the line is active, another write packet is sent, otherwise the interrupt line is negated, and the blocking write is ignored.

Further, this document describes, a system and method of error detection and containment from PCI devices on a PCI bus. This is accomplished by encoding the write requests/packets coming from the PCI devices via a PCI bus, and flagging the write requests/packets having error and blocking the requests/packets having the flag set, and also blocking all future write requests and interrupts from the device associated with requests/packets having the error, and thus preventing the writing of packets containing the error to the memory, and further preventing losing of all data in memory, and from stopping the entire input/output subsystem.

Figure 1:
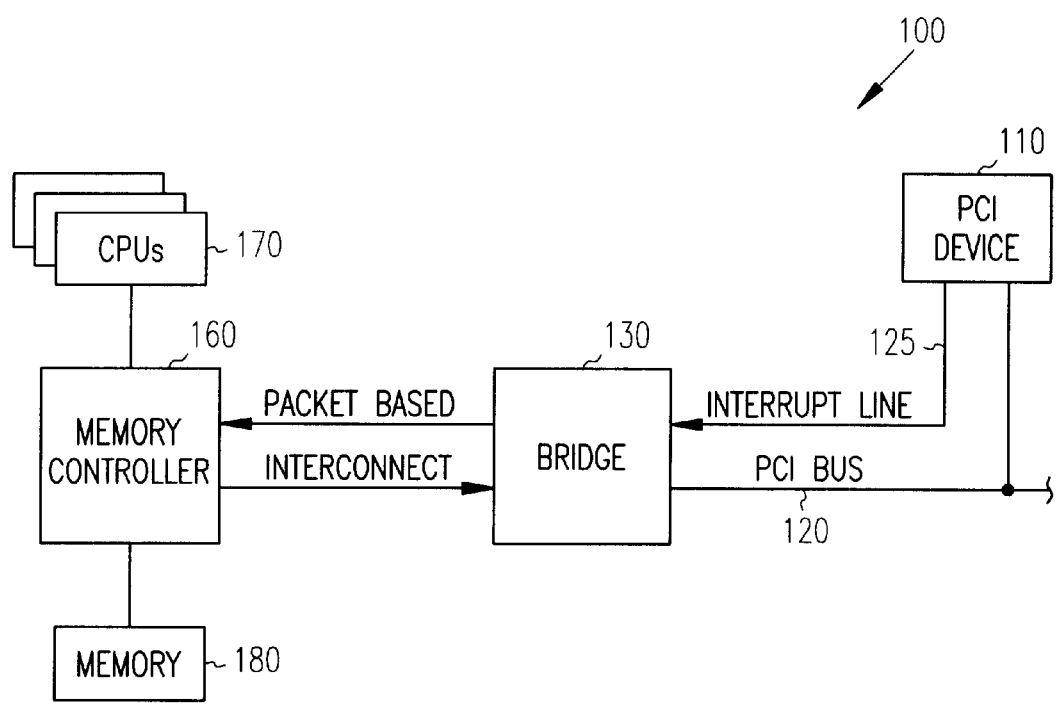
FIG. 1 is a block diagram illustrating generally one embodiment of the computer system including the present subject matter.

FIG. 1 is a block diagram illustrating generally, by way of example, but not by way of limitation, one embodiment of the computer system including the present subject matter 100, the bridge device 130 receives the interrupts generated by the PCI devices 110 via the interrupt line 125. Bridge device 130 encodes the interrupt with source and destination information. Then the bridge device 130 sends an interrupt write packet. The interrupt write packet is transmitted to CPU 170 through a memory controller 160 to launch an interrupt routine. The interrupt routine services the interrupt and the PCI device 110 negates the interrupt line. At this point the CPU 170 generates a non-blocking write rather than a blocking read to the bridge device 130. This write causes the bridge device to check the level of the PCI interrupt line. If the line is asserted (i.e., the interrupt line is active with the interrupt), another write packet is sent, otherwise the interrupt line is negated and the blocking write is ignored. A packet of data generally refers to a minimum unit of data transfer over one of the links. A link is defined as the physical connection from the bridge device to any of the connected devices. Packets can be one of several sizes ranging from a double word (i.e., 8 bytes) to a full cache size line (i.e., 128 bytes) plus a header. Packets are comprised of a 32 bit command word and some or all of the following: a 48 bit address, 16-bit remote map field, data field, and a data enable word. The command word contains destination and source identification numbers, packet type, transaction number, data size, arbitration and control bits.

Figure 2:
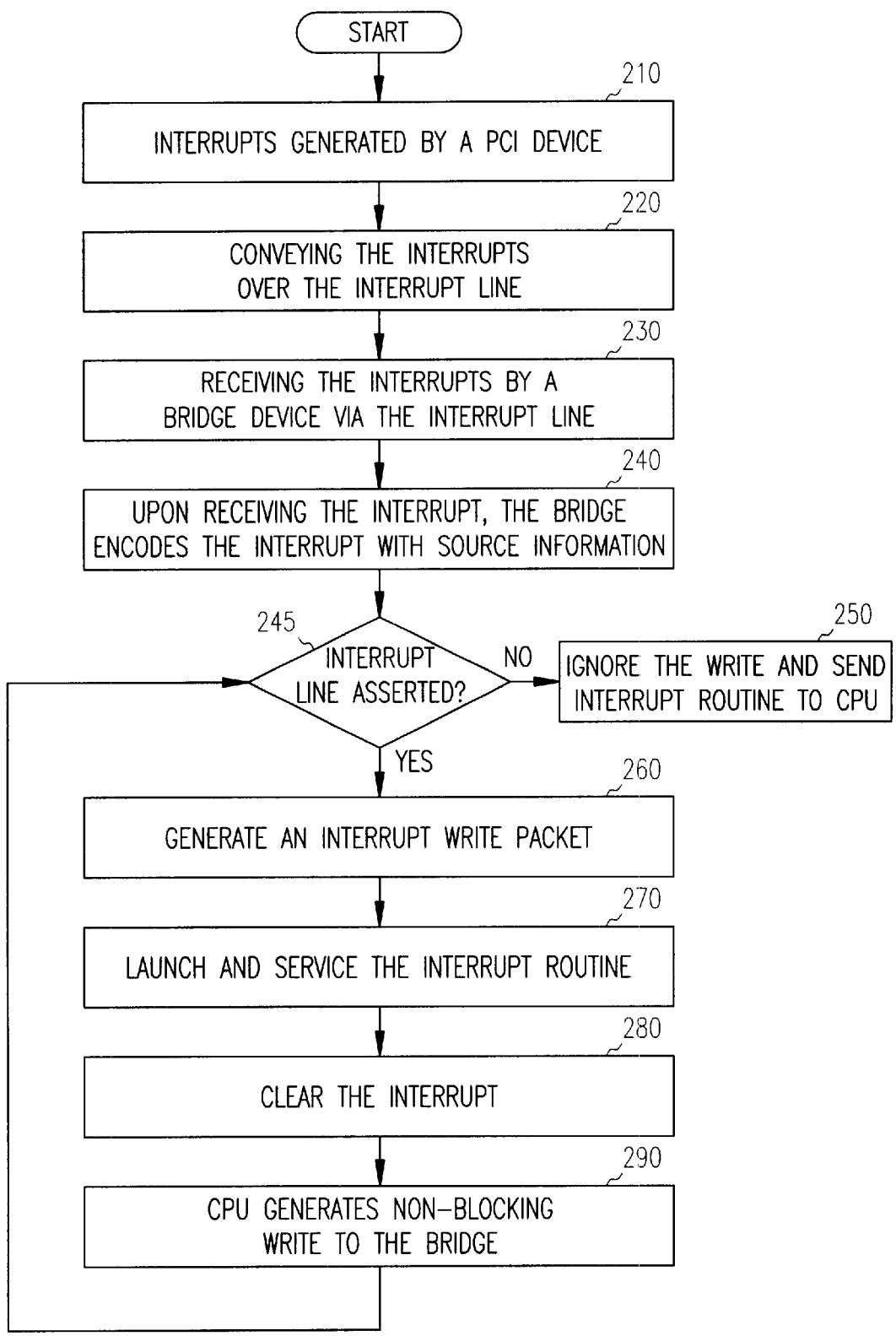
FIG. 2 is a flowchart illustrating generally one embodiment of the operation of the present subject matter.

FIG. 2 is a flow chart illustrating generally, by way of example, but not way of limitation, one embodiment of operation of the computer system of the present subject matter 100. Interrupts generated by a PCI device 210, are received by a bridge device 130 via an interrupt line 220/230. Upon receiving the interrupt the bridge device 130 encodes the interrupt with source and destination information. Also upon receiving the interrupt the bridge device 130 issues an interrupt write packet and transmits the interrupt write packet to CPU 170 through the memory controller 160 to start the interrupt routine 260/270. At the completion of the interrupt routine, the CPU 170 clears the interrupt 280. At this point the CPU 170 generates a non-blocking write rather than a blocking read 290 to the bridge device 130. This write causes the bridge device 130 to check level of the PCI interrupt line 245. If the line is asserted, another interrupt write packet is sent to the CPU, otherwise the interrupt line is negated and the write is ignored 250.

Figure 2A:
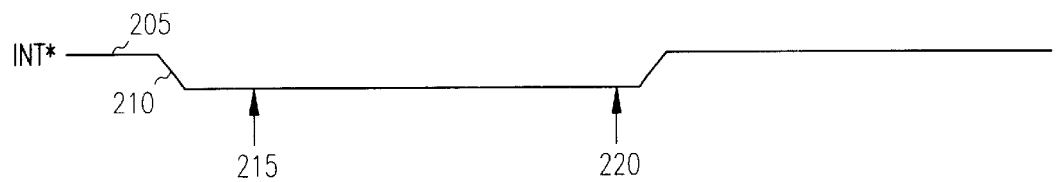
FIGS. 2a, 2b, and 2c are graph/line diagrams illustrating generally embodiments of executing one or more level-based interrupts.

FIG. 2a is a graph/line diagram illustrating generally, by way of example, but not by way of limitation, one embodiment of executing a level-based interrupt generated by a PCI device 110. Interrupt (INT) 205 generated by a PCI device 110 is converted to a write packet and an edge event sent to a CPU 170 through a memory controller 160 (interrupt asserts) 210, then the CPU starts the service routine 215, and then the interrupt routine clears the interrupt and exits 220.

Figure 2B:
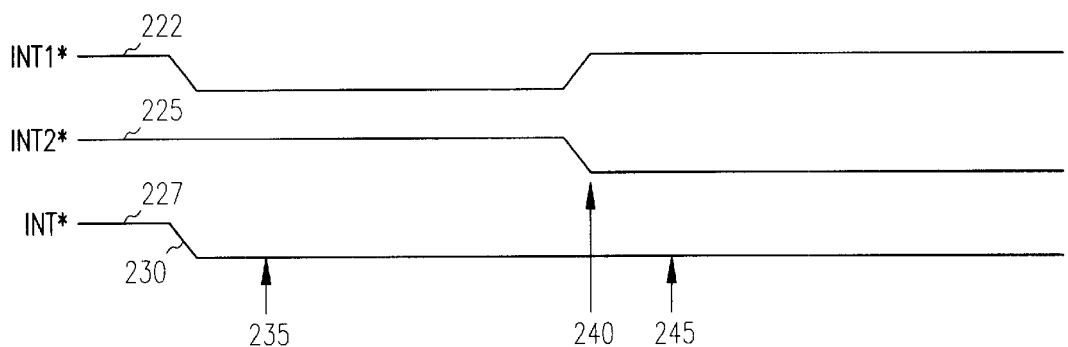

FIG. 2b is a graph/line diagram illustrating generally, by way of example, but not by way of limitation, one embodiment of a situation in which there are two level-based interrupts in the interrupt line 125. Interrupt 1 (INT1) 222 asserts and write packet and an edge event sent 230 to a CPU 170 through a memory controller 160. CPU 170 starts the interrupt routine 235. CPU exits and clears the interrupt routine after completion of the routine 240. Interrupt 2 (INT2) 225 asserts 240, since there is no transition between the interrupts, no level seen by the CPU 170 and therefore no packet sent and interrupt missed 245.

Figure 2C:
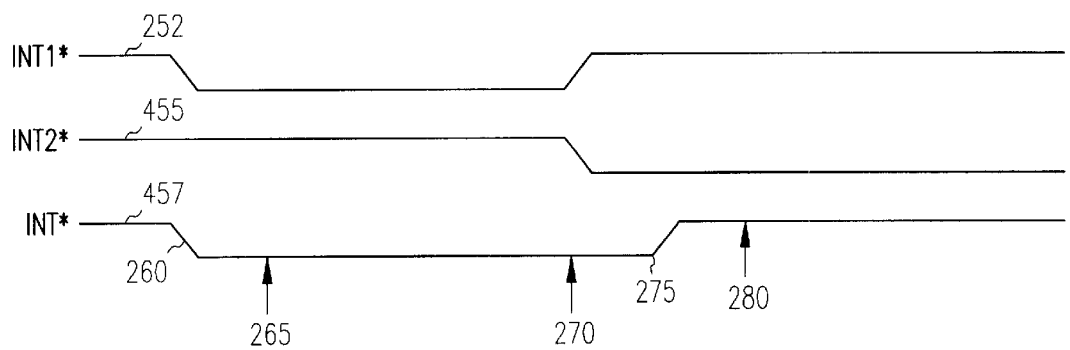

FIG. 2c is a graph/line diagram illustrating generally, by way of example, but not by way of limitation, one embodiment of a situation in which there are two or more level-based interrupts in the interrupt line 125, and including the method of the present subject matter to circumvent the problem of missing the interrupts by the CPU 170. Interrupt 1 (INT1) 222 asserts and write packet sent 260 to a CPU 170 through a memory controller 160. CPU 170 starts the interrupt routine 265. CPU exits and clears the interrupt routine after completion of the routine 270. Interrupt 2 (INT2) 225 asserts 270, if there is more than one interrupt in the interrupt line 125 (line asserted), bridge 130 writes to the register and generates an interrupt write packet 270 and sends it to CPU 170 through the memory controller 160. CPU 170 starts the interrupt INT2 routine 280. If there are no interrupts in the interrupt line 125 (line not asserted), then the write is ignored and the interrupt INT2 is sent to CPU 170 to execute the interrupt routine.

Figure 3:
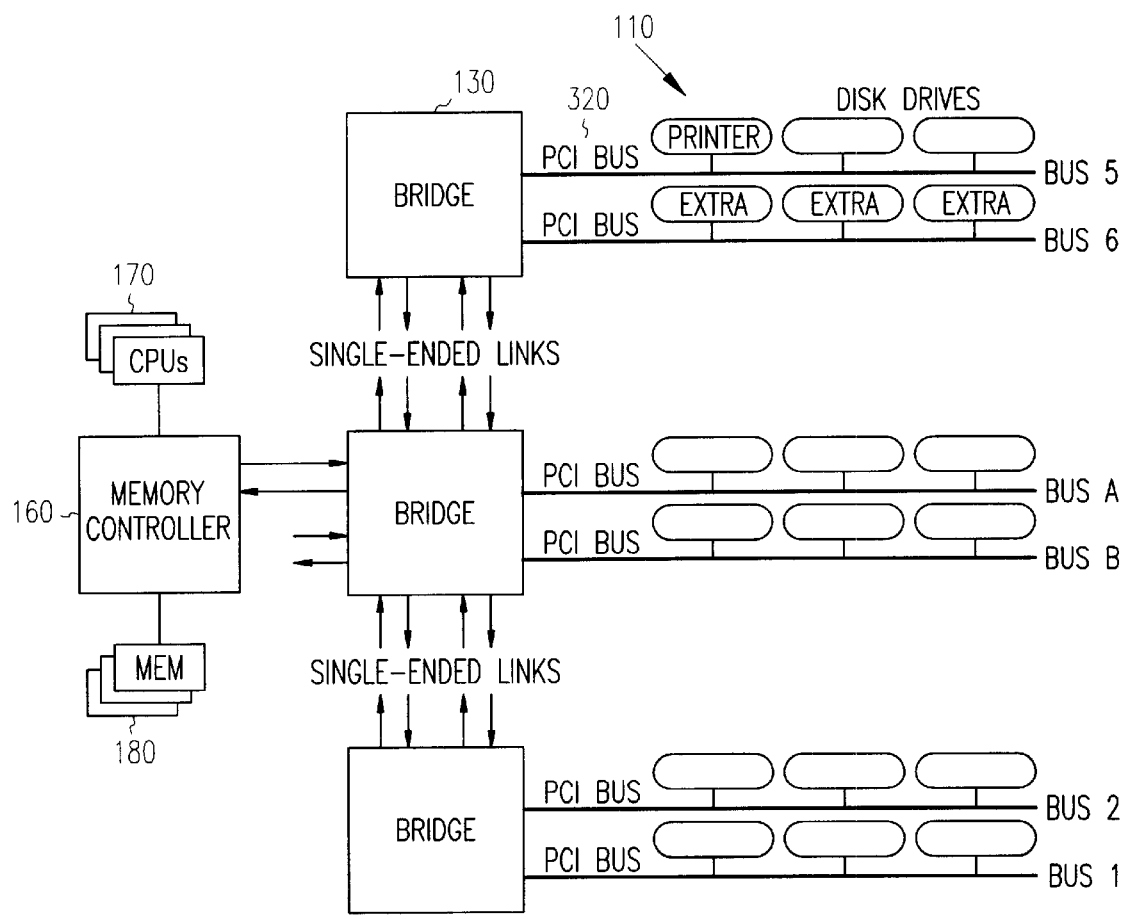
FIG. 3 is a block diagram illustrating generally one embodiment of the computer system including the present subject matter.

FIG. 3 is a block diagram illustrating generally, by way of example, but not by way of limitation, one embodiment of the computer system, incorporating error containment and detection system into the present subject matter 100. In FIG. 3, the computer system having fault detection and retention system includes, for example, a memory controller 160 which facilitates transfer of data between one or more microprocessors 170 and main memory 180, which is composed of DRAM SIMMs. A bridge device 130 is connected to the to the memory controller 160 on one end and acts as an interface, so that various off-the-shelf PCI devices 110 (e.g., printers, monitors, modems, disk drives, etc.,) may be coupled to the bridge device 130 via a PCI bus 120.

In general terms, bridge device 130 receives the write transactions generated by the PCI devices 110 via PCI bus 120. At this point the bridge device 130 checks the write transactions for errors, and translates the write transaction into packets of write requests. Further, the bridge device 130 flags the write requests if an error is found and encodes the write requests with destination and source information. A packet of data refers to a minimum unit of data transfer over one of the links. A link is defined as the physical connection from the bridge device to any of the connected devices. Packets can be one of several sizes ranging from a double word (i.e., 8 bytes) to a full cache size line (i.e., 128 bytes) plus a header. Packets are comprised of a 32 bit command word and some or all of the following: a 48 bit address, 16-bit remote map field, data field, and a data enable word. The command word contains destination and source identification numbers, packet type, transaction number, data size, arbitration and control bits. One or more packets of data are transmitted from one or more source devices 110 over established links such as PCI bus 120 through the bridge device 130 to one or more destination devices such as memory controller 160. After flagging and encoding of the write requests by the bridge device 130, the write request packets are received by the memory controller 160, where the memory controller checks the write request packets to see whether the flag is set (set by the bridge device 130 if an error is found in the write request packets). If the flag is set in the write request packet, then the memory controller 160 suppresses the write request and disables all future write transactions and interrupts from the associated PCI device. If the flag is not set, then the memory controller 160 transmits the write request to the memory 180. In one embodiment the system 100 has an error handling routine to re-enable the disabled PCI devices 110 by the memory controller 160 due to the presence of a parity error in the write request coming from that device. In another embodiment, the system checks for parity errors based on address and data.

Figure 4:
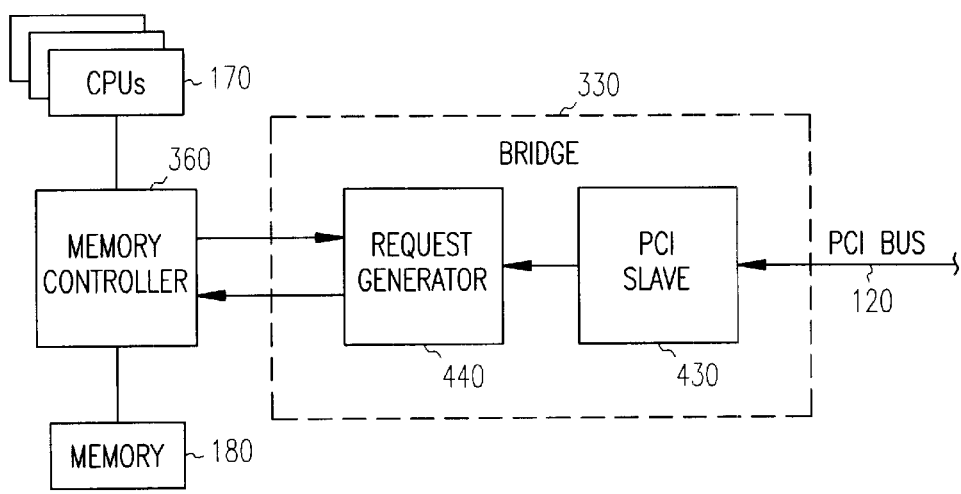
FIG. 4 is a block diagram illustrating generally one embodiment of the computer system including an error detection and containment sub system.

In one embodiment, the bridge device 130 includes a PCI slave 430 coupled to a request generator 440 as shown in the exemplary detailed block diagram of FIG. 4. PCI slave 430 receives the write transactions generated by the PCI devices 110 via PCI bus 120 and checks the write transactions for the presence of an error. Then the write transactions are received by the request generator 440. At this point, the request generator 440 is responsible for packet generation, address translation, encoding the packet with source and destination information, and for flagging the packets for any errors found by the PCI slave 430. A memory controller 160 coupled to the request generator 440 on the other end receives the write requests encoded and flagged by the request generator 440. Memory controller 160 and bridge device 130, including PCI slave 430 and request generator 440 may include a microprocessor or other controller for execution of software and/or firmware instruction.

Figure 5:
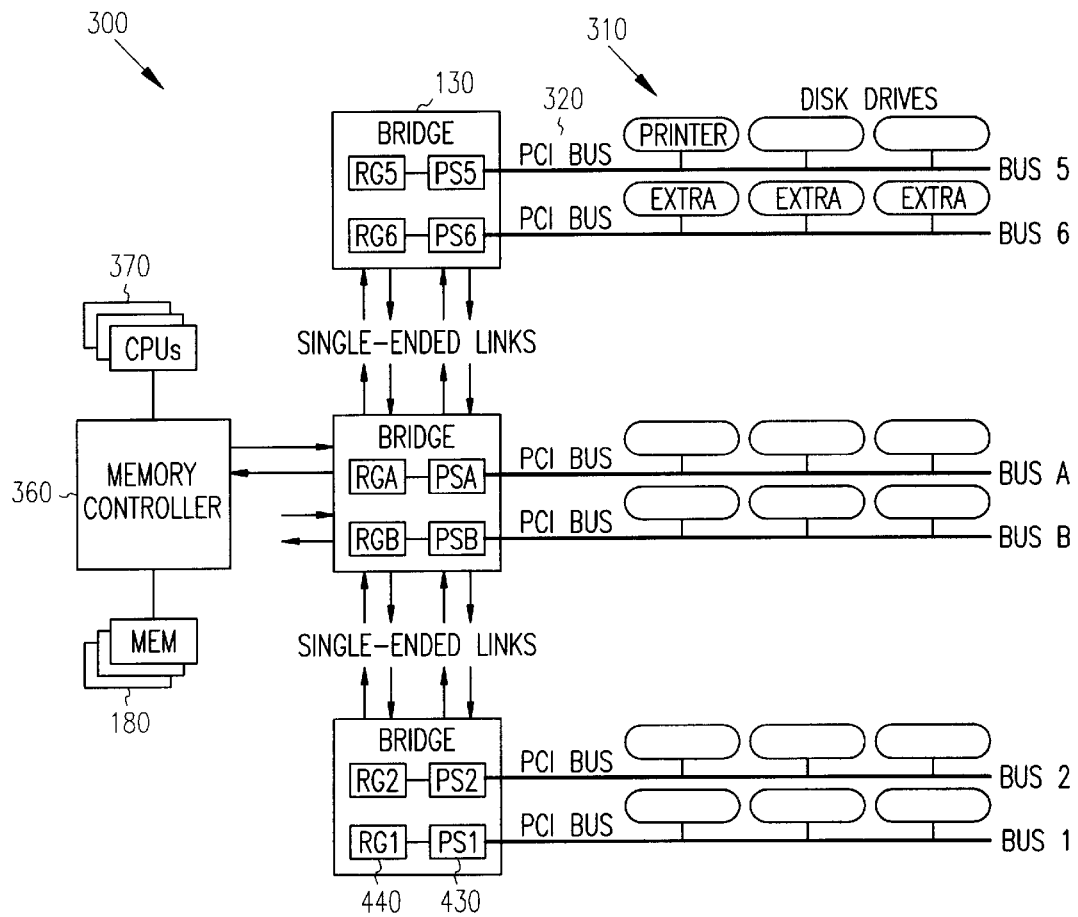
FIG. 5 is a detailed block diagram illustrating generally one embodiment of the bridge device including the error detection and containment sub system.

FIG. 5 is a schematic block diagram that illustrates generally, by way of example, but not by way of limitation, one embodiment of the configuration of a computer system of the present subject matter 100 incorporating an error detection and containment system, showing the scheme of having dedicated PCI slaves 430 and dedicated request generators 440 for each of the PCI buses 120 coupled the bridge devices 130 as shown.

Figure 6:
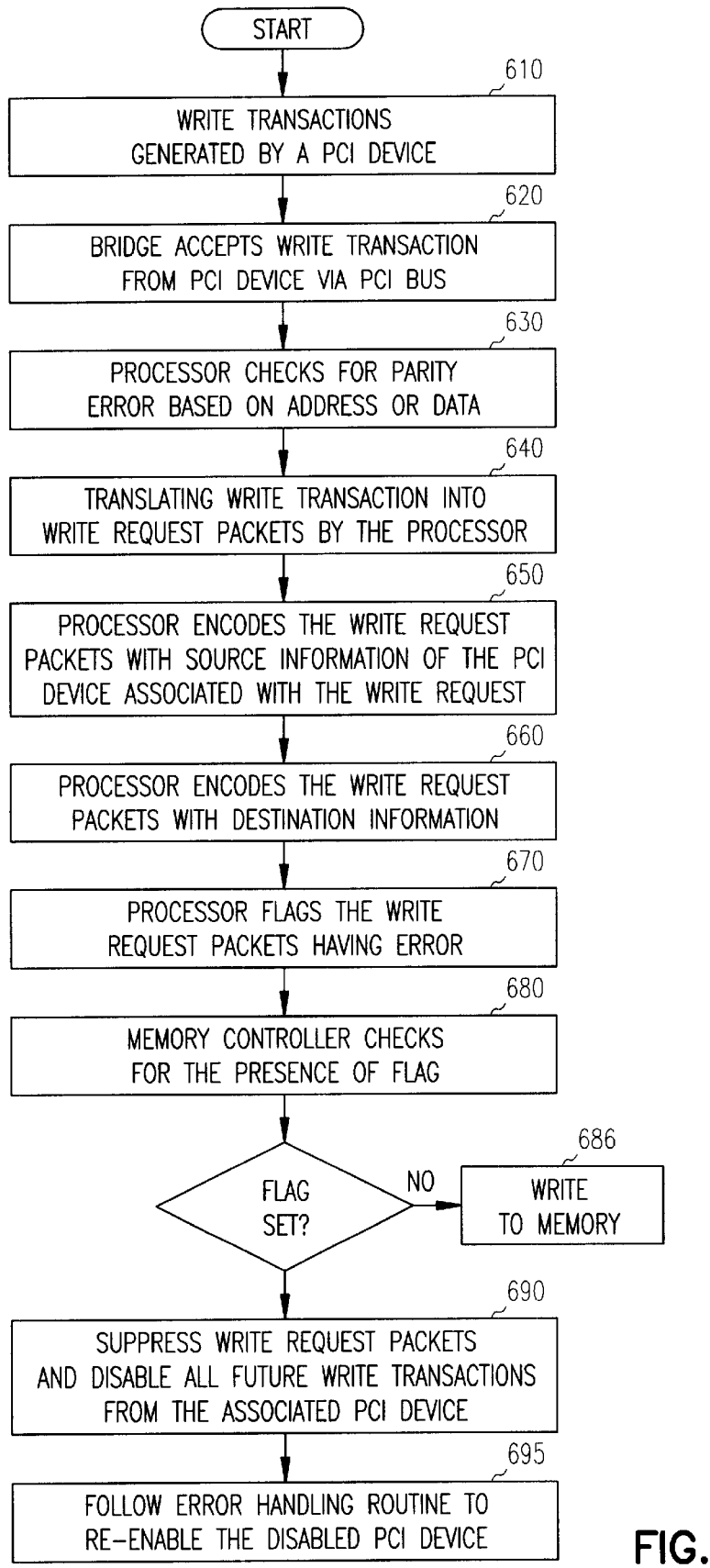
FIG. 6 is a block diagram illustrating generally one embodiment of the use of dedicated PCI slaves and request generators in the bridge devices for each of the PCI buses coupled to the respective bridge devices.

FIG. 6 is a flow chart illustrating generally, by way of example, but not way of limitation, one embodiment of operation of the computer system 100 incorporating the error detection and containment system having fault detection and containment system. Upon receiving the write transactions 610/620 generated by a PCI device 110, bridge device 130 checks for parity error 630. Then the bridge device 130 translates the write transactions into write request packets 640. Further the bridge device 130 encodes the write request packets with source 650 and destination 660 information, and flags 670 the write requests having error. At this point, a memory controller 160 receives the write requests and checks for the presence of the flag 680. The memory controller 160 suppresses the write requests if the flag is set and disables all future write transactions and interrupts from the associated PCI device 690 to prevent losing of data in memory 180, and to prevent generating false interrupts due to write errors. If the flag is not set by the memory controller 160 transmits the write request to the memory 180. In one embodiment, the system 100, has an error handling routine 495 to re-enable the disabled PCI device 110. In one embodiment, the system 100, checks the parity error based on address, and in another embodiment, the system 100, checks the parity error based on data 430.

It is understood that the above description is intended to be illustrative, and not restrictive. Many other embodiments will be apparent to those of skill in the art upon reviewing the above description. The scope of the invention should therefore, be determined with reference to the appended claims, along with the full scope of equivalents to which such claims are entitled.

Conclusion

The above-described system provides, among other things, a translation of PCI level interrupts into packet based messages for edge event drive microprocessors. The present system and method allows detection of the presence of multiple interrupts in the interrupt line and issues an interrupt write packet to circumvent the problem of overlooking, missing or repeating an interrupt by a microprocessor. Also, the above described system provides, a fault detection and containment system for computer systems. The allows detection of parity errors coming from write requests of coupled PCI devices via PCI bus, and suppresses the write requests and interrupts having error before writing to the memory to prevent corrupting and losing of all data in the memory, and hence to increase the up-time of the computer systems.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system comprising:
   one or more Peripheral Component Interconnect (PCI) devices for generating interrupts;
   an interrupt line for conveying the interrupts generated by the PCI devices;
   a bridge device, coupled to the interrupt line, for receiving a first interrupt from the PCI devices via the interrupt line, wherein, when the bridge device receives the first interrupt, the bridge device generates a first interrupt write packet; and
   one or more microprocessors communicatively coupled to the bridge device, wherein the one or more microprocessors includes a first microprocessor, wherein the first microprocessor receives the interrupt write packet from the bridge device and initiates an interrupt routine associated with the first interrupt; and
   wherein the bridge device generates a second interrupt write packet if an interrupt exists on the interrupt line upon completion of the interrupt routine associated with the first interrupt.

2. The computer system of claim 1, wherein the bridge device includes a bridge register, wherein, when a write is issued to the bridge register by one of the PCI devices, the bridge device sends a interrupt write packet to the first microprocessor.

3. A computer system comprising:
   one or more Peripheral Component Interconnect (PCI) devices for generating interrupts;
   an interrupt line for conveying the interrupts generated by the PCI devices;
   a bridge device, coupled to the interrupt line, for receiving the interrupts from the PCI devices via the interrupt line, wherein, when the bridge device receives the interrupts, the bridge device generates an interrupt write packet;
   one or more microprocessors communicatively coupled to the bridge device, wherein the one or more microprocessors includes a first microprocessor, wherein the first microprocessor receives the interrupt write packet from the bridge device and initiates an interrupt routine; and
   a PCI bus coupled to the bridge device for receiving write transactions generated by the PCI devices, wherein, when the bridge device receives the write transactions, the bridge device checks the write transactions for error and flags the write transactions having an error, wherein the bridge device further translates the write transactions error into one or more write request packets.

4. A computer system comprising:
   one or more Peripheral Component Interconnect (PCI) devices for generating interrupts;
   an interrupt line for conveying the interrupts generated by the PCI devices;
   a bridge device, coupled to the interrupt line, for receiving the interrupts from the PCI devices via the interrupt line, wherein, when the bridge device receives the interrupts, the bridge device generates an interrupt write packet;
   one or more microprocessors communicatively coupled to the bridge device, wherein the one or more microprocessors includes a first microprocessor, wherein the first microprocessor receives the interrupt write packet from the bridge device and initiates an interrupt routine; and
   wherein the computer system further comprises a PCI bus connected to the bridge device and to the PCI devices, wherein the bridge device comprises a PCI slave, coupled to the PCI bus, for checking parity errors in write transactions received from the PCI device.

5. The computer system of claim 4 wherein, the PCI slave includes logic for disabling write transactions from PCI devices that generated parity error in a write transaction.

6. The computer system of claim 4, wherein the bridge device further comprises a request generator for encoding the write transactions received from the PCI devices through the PCI slave with destination and source information.

7. The computer system of claim 6, wherein the request generator flags the write transactions when a parity error is found by the PCI slave.

8. The computer system of claim 6, where in the request generator includes logic for encoding interrupts received from the interrupt line.

9. A method of processing interrupts received from PCI devices, the method comprising:
   receiving an interrupt;
   constructing an interrupt write packet, wherein the interrupt write packet includes a PCI device identifier and a destination address;
   transmitting the interrupt write packet to a CPU;
   receiving the interrupt write packet at the CPU;
   starting an interrupt routine associated with interrupt;
   generating a non-blocking write;
   checking whether the interrupt is still active; and
   if the interrupt is still active, generating a new interrupt write packet to the CPU.

10. The method of claim 9, wherein, if the interrupt is not still active, the non-blocking write is ignored.

11. The method of claim 9, wherein receiving an interrupt includes determining if the PCI device was disabled due to a parity error, and if the PCI device was disabled due to parity error, suppressing the interrupt.

* * * * *